United States Patent
Haumont

(10) Patent No.: US 7,724,711 B2
(45) Date of Patent: May 25, 2010

(54) METHOD OF SPEEDING UP THE REGISTRATION PROCEDURE IN A CELLULAR NETWORK

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 1080 days.

(21) Appl. No.: 10/520,430

(22) PCT Filed: Aug. 5, 2002

(86) PCT No.: PCT/IB02/03030

§ 371 (c)(1),
(2), (4) Date: Jan. 6, 2005

(87) PCT Pub. No.: WO2004/016026

PCT Pub. Date: Feb. 19, 2004

(65) Prior Publication Data

US 2005/0249238 A1  Nov. 10, 2005

(51) Int. Cl.
H04W 4/00 (2009.01)
H04L 12/28 (2006.01)
H04J 3/16 (2006.01)

(52) U.S. Cl. .................. 370/338; 370/401; 370/469; 455/435.1

(58) Field of Classification Search .................. None
See application file for complete search history.

(56) References Cited

U.S. PATENT DOCUMENTS

| | | | | |
|---|---|---|---|---|
| 6,571,095 B1 * | 5/2003 | Koodli | ..... | 455/435.1 |
| 6,683,881 B1 * | 1/2004 | Mijares et al. | ..... | 370/401 |
| 6,721,560 B1 * | 4/2004 | Laiho | ..... | 455/432.1 |
| 6,725,038 B1 * | 4/2004 | Subbiah | ..... | 455/436 |
| 6,842,462 B1 * | 1/2005 | Ramjee et al. | ..... | 370/466 |
| 6,990,089 B2 * | 1/2006 | Benedyk et al. | ..... | 370/338 |
| 7,002,912 B2 * | 2/2006 | Wengrovitz | ..... | 370/230 |
| 7,023,825 B1 * | 4/2006 | Haumont et al. | ..... | 370/338 |
| 7,024,460 B2 * | 4/2006 | Koopmas et al. | ..... | 709/206 |
| 7,035,621 B1 * | 4/2006 | Hurtta | ..... | 455/412.1 |
| 7,082,119 B1 * | 7/2006 | Tamsil | ..... | 370/352 |
| 7,209,459 B2 * | 4/2007 | Kangas | ..... | 370/329 |
| 7,218,618 B2 * | 5/2007 | Greis et al. | ..... | 370/328 |
| 7,324,529 B2 * | 1/2008 | Lucidarme et al. | ..... | 370/401 |
| 7,380,124 B1 * | 5/2008 | Mizell et al. | ..... | 713/171 |
| 7,436,827 B2 * | 10/2008 | Greis et al. | ..... | 370/389 |
| 2001/0017856 A1 * | 8/2001 | Asokan et al. | ..... | 370/389 |

(Continued)

FOREIGN PATENT DOCUMENTS

WO  WO 00/44191 A1  7/2000

(Continued)

Primary Examiner—Hong Cho
Assistant Examiner—Hicham B Foud
(74) Attorney, Agent, or Firm—Ditthavong Mori & Steiner, P.C.

(57) ABSTRACT

A method of carrying an application level message encapsulated inside a signaling message of an access network is described. The method includes receiving an application level message from a sender application process to an access network signaling process, adapting the application level message and encapsulating the application level message in a signaling message of an access network, and delivering the encapsulated application level message to a receiver application process by transmitting the signaling message, The encapsulated application level message is transparent to the devices of the access network transmitting the signaling message.

39 Claims, 4 Drawing Sheets

U.S. PATENT DOCUMENTS

| | | | |
|---|---|---|---|
| 2001/0053145 A1* | 12/2001 | Willars et al. | 370/352 |
| 2002/0126636 A1* | 9/2002 | Chen | 370/329 |
| 2002/0131395 A1* | 9/2002 | Wang | 370/349 |
| 2002/0150092 A1* | 10/2002 | Bontempi et al. | 370/389 |
| 2003/0039231 A1* | 2/2003 | Sinnarajah et al. | 370/335 |
| 2003/0041122 A1* | 2/2003 | Segal | 709/219 |
| 2003/0043992 A1* | 3/2003 | Wengrovitz | 379/229 |
| 2003/0081607 A1* | 5/2003 | Kavanagh | 370/392 |
| 2003/0108067 A1* | 6/2003 | Craig et al. | 370/522 |
| 2003/0174679 A1* | 9/2003 | Viola et al. | 370/338 |
| 2003/0217174 A1* | 11/2003 | Dorenbosch et al. | 709/237 |
| 2004/0037269 A1* | 2/2004 | Lundin | 370/352 |
| 2007/0297413 A1* | 12/2007 | Uskela et al. | 370/392 |

FOREIGN PATENT DOCUMENTS

| | | | | |
|---|---|---|---|---|
| WO | WO 01/86974 | * | 5/2001 | 370/389 |
| WO | WO 02/056618 A2 | | 7/2002 | |

* cited by examiner

METHOD OF SPEEDING UP THE REGISTRATION PROCEDURE IN A CELLULAR NETWORK

FIELD OF THE INVENTION

The present invention relates to a method of speeding up the registration procedure in a cellular network.

PRIOR ART

The current wireless networks need a separate message to manage the connectivity to an external network, e.g. get connected to the network (PDP context activation), and to register, with a given application, e.g. the Session Initiation Protocol (SIP) register procedure for the Voice over Internet Protocol (VoIP) or instant messaging, etc. This implies that two round trip delays (over the radio distance) minimum are needed before the application becomes available.

In a cellular network, sending a packet does not only imply the physical transmission time of a packet over the radio, but also the time to establish radio resources. This time can be significant (seconds), as is known from the live network behavior of General Packet Radio Systems (GPRS).

In addition, in a typical mobile terminal, the Packet Data Protocol (PDP) context is started when an application that may need this Packet Data Protocol (PDP) context is started. At this time this application already has the information it needs to register (even if the destination may be a logical name instead of an IP address).

The following two possibilities serve as examples.

A Packet Data Protocol (PDP) context may be established first, and then an application level message would be sent which however adds a second round trip delay over the radio distance.

Another one is to send a Remote Authentication Dial-In User Service (RADIUS) start message from a Gateway GPRS Support Node (GGSN) when a Packet Data Protocol (PDP) context is established. However, this does not allow the mobile terminal to send information which is specific to it (the mobile terminal's capabilities; the type of push service wanted; an instant messaging group to join; its signature; application settings etc.) and requires a pre-configuration of all application servers in the Gateway GPRS Support Node (GGSN).

Another important design criteria in a cellular network is to maintain the access network (e.g. of GPRS type) quite independent from the applications, so that new applications can be added transparently to the access network.

SUMMARY OF THE INVENTION

Therefore, it is an object of the present invention to deal with the problems of the prior art, and to provide a method of speeding up the registration procedure in a cellular network.

According to the present invention, this object is solved by providing a method of carrying an application level message encapsulated inside a signaling message of an access network, said method comprising the steps of: receiving an application level message from a sender application process to an access network signaling process; adapting said application level message and encapsulating it in a signaling message of an access network; and delivering said encapsulated application level message to a receiver application process by transmitting said signaling message, wherein said encapsulated application level message is transparent to the means of said access network transmitting said signaling message. Advantageous modifications are defined in the appended dependent claims.

Hence one or many encapsulated application level messages are included in the Packet Data Protocol (PDP) context signaling (e.g. especially in the activation request), so that if the Packet Data Protocol (PDP) context is accepted, gateway node means (e.g. the Gateway GPRS Support Node (GGSN)) will send the application level message on behalf of the mobile terminal to an application server (e.g. a Proxy Call State Control Function (P-CSCF); a push proxy server (e.g. Wireless Application Protocol (WAP) gateway) or an instant messaging server).

In particular, the method according to the present invention allows with only one round-trip over the radio:

- to establish one Packet Data Protocol (PDP) context and register in one or more application; or
- to establish one secondary Packet Data Protocol (PDP) context and to send a ringing indication to the other party; or
- to modify a Packet Data Protocol (PDP) context and signal the Quality-of-Service (QoS) change to the other end; or
- to deactivate the Packet Data Protocol (PDP) context and de-register from an application.

The present invention is presently considered to be particularly applicable to a Session Initiation Protocol (SIP) signaling, but also to other signaling such as a Resource Reservation Protocol (RSVP) signaling, or to a Point to Point protocol (PPP) signaling.

According to the present invention, the registration procedure in general is speeded up. Moreover, the method according to the present invention is especially efficient to speed up a call establishment procedure for Voice over IP (VoIP) as it can be applied also when a Real-Time (RT) secondary Packet Data Protocol (PDP) context is established.

As a consequence, the delay is reduced. Further, the radio and the backbone is optimized by reducing the needs for radio signaling and reducing the number of packets sent.

A key feature of the present invention is to maintain logical independence between the application layer (e.g. SIP or WAP—Wireless Application Protocol) and the access layer (e.g. GPRS). This independence is based on the fact that the access layer does not need to understand application signaling. It only needs to know how to forward it. Therefore, any new application could obtain the benefit of this functionality without further changes needed in the access layer.

According to the present invention, the present object is further solved by providing a system adapted to perform a transmission of an application level message encapsulated inside a signaling message of an access network, comprising: receiving means adapted to receive an application level message from a sender application process to an access network signaling process; adapting means for encapsulating said application level message in a signaling message of an access network; and delivering means adapted to deliver said encapsulated application level message to a receiver application processing means.

BRIEF DESCRIPTION OF THE DRAWINGS

Further details of the present invention will become apparent from the following description of the preferred embodiments which is to be taken in conjunction with the appended drawings, in which.

DESCRIPTION OF THE PREFERRED EMBODIMENTS

Figure 1:
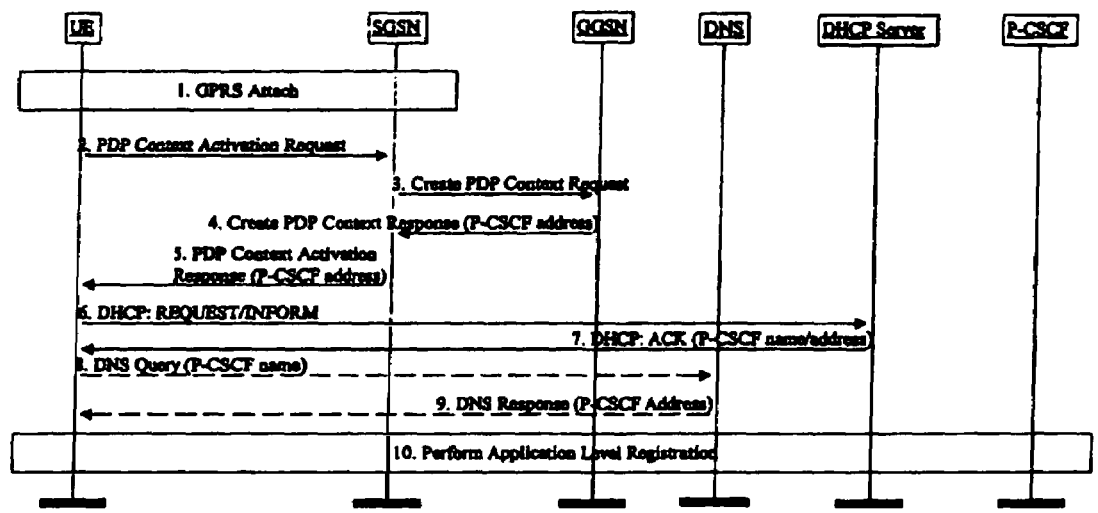
FIG. 1 shows a comparative example illustrating a VoIP signaling based on existing knowledge depicting a GPRS attach, a signaling for a Packet Data Protocol (PDP) context activation, a Proxy Call State Control Function (P-CSCF) discovery, and a Session Initiation Protocol (SIP) registration.
Figure 2:
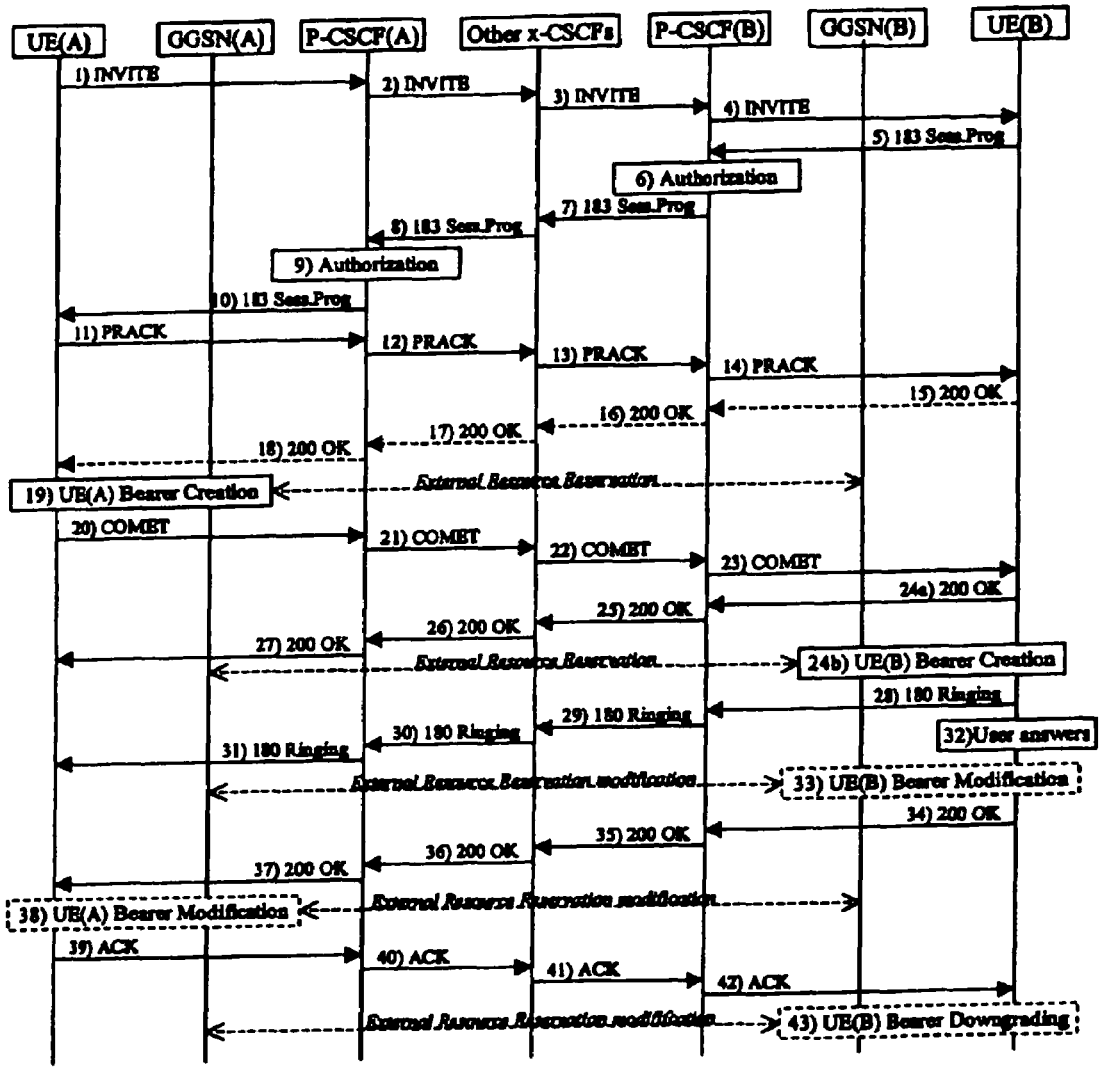
FIG. 2 shows another comparative example illustrating a VoIP signaling based on existing knowledge depicting the signaling foreseen to establish a call.

At first, reference is made to the comparative example depicted in FIGS. 1 and 2, illustrating a current view of VoIP signaling based on existing knowledge.

In these figures, DNS denotes a directory name service, and DHCP denotes a dynamic host configuration protocol, while UE denotes a user equipment such as a mobile terminal. Other denotations are explained elsewhere in the present description.

A rough count reveals a minimum of 25 messages over the radio distance including Radio Resource Control (RRC) messages which are not depicted here for a mobile terminal UE to fixed phone call, when starting with a turned off mobile terminal UE; and at least 40 messages over the radio distance for a mobile terminal UE(A) to mobile terminal UE(B) call, if the called mobile terminal UE(B) is not Radio Resource Control (RRC) connected.

From this realization, it becomes clear why there is a need to optimize the delay.

It is remarked that according to the present invention, as will be apparent from the description given below, a gain of four to five messages may be obtained over the radio distance, since Session Initiation Protocol (SIP) registration messages can be embedded in a Packet Data Protocol (PDP) context activation request/response, and "COMET"-/"2000K"-messages can be embedded in step 19 (a secondary Packet Data Protocol (PDP) context activation request/response), while the ringing messages can be embedded in step 24 (secondary PDP context activation request). The details of embedding are described below.

A further gain can be achieved if there is a need to modify the bearer (step 33-38) or if the external resources reservation requires an end to end, i.e. mobile terminal to mobile terminal, signaling based on the Resource Reservation Protocol (RSVP).

Figure 3:
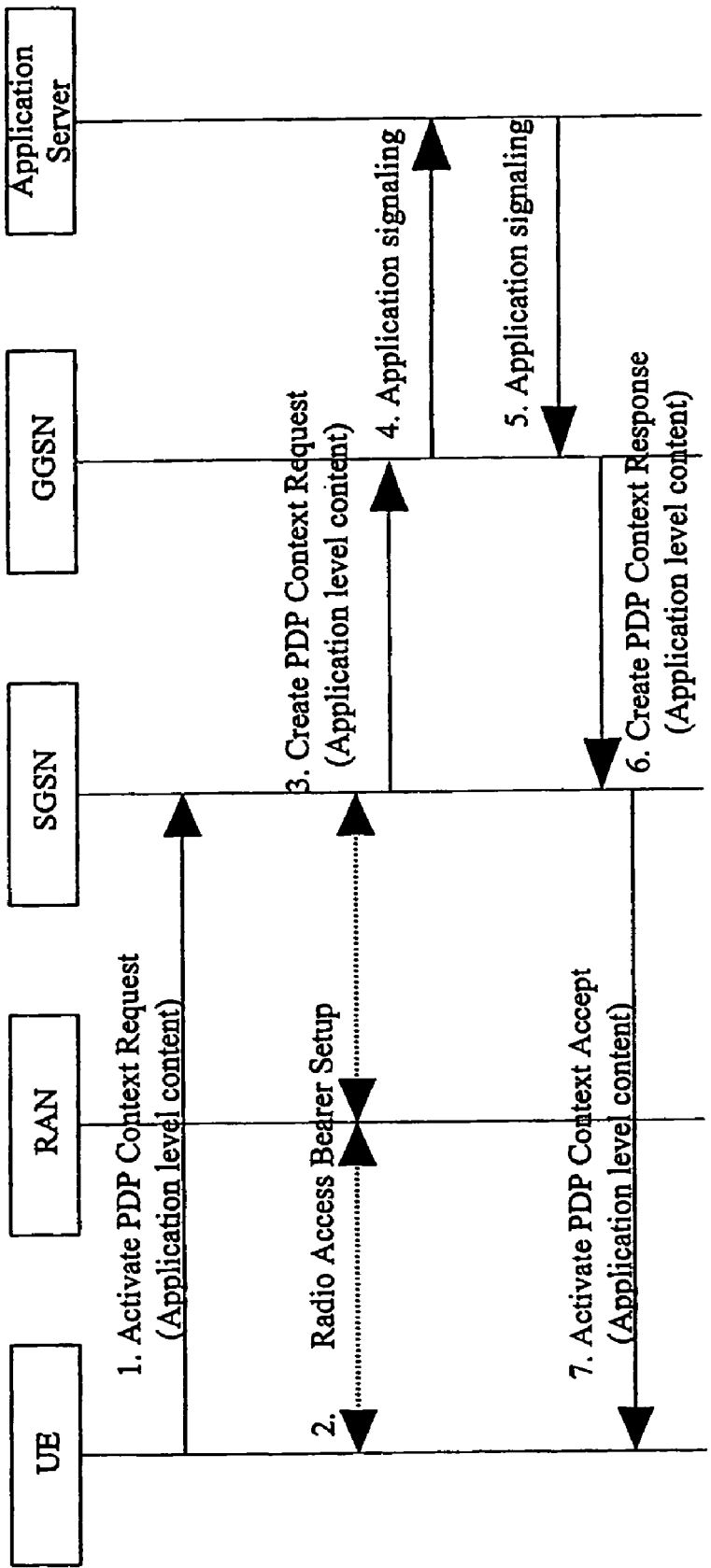
FIG. 3 shows a Packet Data Protocol (PDP) context activation according to the present invention.

Next, reference is made to FIG. 3 which shows a Packet Data Protocol (PDP) context activation as a preferred embodiment according to the present invention.

Firstly, an application (inside the mobile terminal or in a separate device such as a laptop) requests the mobile terminal UE to initiate a Packet Data Protocol (PDP) context activation. In the same time, the application provides to the session management stack of the mobile terminal UE (this is the software in charge of activating the PDP context) an application level message. This application level message which is to be encapsulated may be a complete message such as a SIP registration message or a request to establish a WAP session. The mobile terminal UE adds the information provided by the application in an optional Information Element (IE) which shall be called "encapsulated application level message IE" in the PDP context activation request message. The thus encapsulated application level message is then transparently forwarded by the Serving GPRS Support Node SGSN to the GGSN in the Create PDP Context Request. Here, the term "transparently forwarded" implies that the optional encapsulated application level message information element is copied from one message to the other without being interpreted by the SGSN. This Packet Data Protocol (PDP) context may be a normal PDP context, a signaling PDP context or a secondary PDP context.

Secondly, the Radio Access Bearer (RAB) is set up. It should be noted that step 2 and 3 may be performed in a different order or even in parallel without modifying the idea of the invention.

Thirdly, the Serving GPRS Support Node SGSN sends the Create PDP Context Request message to the selected Gateway GPRS Support Node GGSN. According to the above, also this message includes the optional encapsulated application level message information element.

When receiving the request, the GGSN will interpret the encapsulated application level message information element. The encapsulated application level message information element indicates which information should be sent to which destination address, i.e. a logical name or IP address, and under which condition, for example, if the Packet Data Protocol (PDP) context is accepted; if the Packet Data Protocol (PDP) context is accepted with the requested Quality-of-Service (QoS) (Here, the GGSN firstly processes the PDP context request normally. If the output is that the PDP context is accepted (with the same Quality-of-Service in option 2), it sends the application level message forward. If the PDP context is rejected, (or the Qulaity-of-Service is modified in option 2) the application level message is then just erased) if the response should be sent immediately or only when the application server response is received; etc. If the destination address is indicated as a logical name (e.g. "SIPproxy" or "WAPgateway"), the GGSN resolves a logical name from its configured data (e.g. Access Point Name (APN) configuration) or by querying the Directory Name Service DNS system. The GGSN extracts the content from the encapsulated application level message and, forwards it, in step 4, to the application server by using information sent in encapsulated application level message information element, and/or information coming from the PDP context and/or information coming from configuration. Preferably, the GGSN uses the IP address of the Packet Data Protocol (PDP) context as source address.

In a particularly preferred embodiment, the application level option includes a complete Session Initiation Protocol (SIP) message. The Gateway GPRS Support Node GGSN just has to create the IP/UDP (User Datagram protocol) header, and to forward the message to the SIP proxy. The creation of the IP/UDP header is made by using information sent in an optional encapsulated application level message information element (for details, see the description related to FIG. 4), and/or information coring from the PDP context (e.g. PDP type indication if IPv4 or IPv6 should be used; source address is the UE IP address) and/or information coming from a configuration (e.g. a destination address may be derived from logical name).

If the application level option indicated that the GGSN should send the Create PDP Context Response only when the application server response is received, the GGSN will start a timer to wait for answer. If a reply from the application server is received before the timer expires (step 5), this reply or part of it is copied into the application level option information element (IE) of the Create PDP Context Response. If no reply is received before the timer expires, Create PDP Context Response is seat with an indication "server not answering".

If the application level option indicated that the GGSN should send the Create PDP Context Response immediately, step 5 is omitted and the GGSN sends a Create PDP Context Response. The reply from the server will naturally be sent to the IP address of the mobile terminal UE and be carried over to the PDP context as normal IP traffic.

In step 6, the GGSN sends a Create PDP Context Response, containing an indication that the application level option has been understood. This indication may be a new application level option containing information returned by the application server, an indication that the encapsulated application level message has been successfully forwarded (e.g. cause "application level option successful"), or an error indication (e.g. "unknown logical name"; "unreachable destination address"; "invalid application level option format"; "server not answering"). This indication is coded as a new optional information element IE.

In step 7, the SGSN sends the Activate PDP Context Accept containing the same indication received from the GGSN. The SGSN shall not interpret this indication, but only copy the indication received in the Create PDP Context Response into the Activate PDP Context Accept message.

When receiving the Activate PDP Context Accept, the mobile terminal UE informs its application process that the PDP context activation was successful and provides the indication to the application process. As mentioned earlier, this indication may be an application level option containing information returned by the application server, or an application level cause indicating success or failure.

This indication is needed in order to support backward compatibility. The reason is that a mobile terminal UE cannot know if a network (i.e. both SGSN and GGSN) supports the feature as proposed according to the present invention. If the SGSN does not support the feature, the new optional information element IE as proposed will not be forwarded to the GGSN. Therefore, the GGSN will behave normally and not send back any indication to the SGSN about the application level. The SGSN is not sending any indication to the mobile terminal UE. Hence, the mobile terminal UE will also not pass any indication to the application process. The application will then know it has to resend its application as normal traffic (e.g. a IP/UDP/SIP packet over the established PDP context).

If the GGSN does not support the proposed functionality, it ignores the unknown optional information element IE, and correspondingly does not return any indication to the SGSN. The SGSN is not sending any indication to the mobile terminal UE. Thus, the mobile terminal UE will not pass any indication to the application process. The application will then know it has to resend its application as normal traffic (e.g. a IP/UDP/SIP packet over the established PDP context).

Therefore, according to the above, if the SGSN or the GGSN does not support the proposed functionality, the UE and the application will behave as currently, even if the benefit of the proposed functionality is obviously lost. However, this kind of compatibility is an advantage of the present invention.

Other alternative implementations are possible such as having a full IP packet embedded in the session management (SM) signaling in the optional information element IE which would be good for the IP security protocol (IPsec). It should be noted that this solution would work in the Activate PDP Context Request message only if a static address is used, as the mobile terminal UE would not yet know its address. However, this alternative implementation can be used also with a dynamic address in all the other session management (SM) messages (e.g. Activate PDP Context Response; Activate Secondary PDP Context Request; Modify PDP Context Request). Another option is to have only an Extensible Markup Language (XML) extension carried in the application level option information element between the mobile terminal UE and the GGSN that the GGSN will always forward to an application server by using a pre-configured protocol (e.g. the Session Initiation Protocol). The GGSN may also add an extension containing other information known about the user (e.g. a user identity such as MSISDN; Charging ID; APN used; IP address allocated; etc.).

Encapsulated Application Level Message

As a preferred embodiment of the present invention, it is proposed to change all session management (SM) messages by adding the new optional information element (IE).

In the following, the list of the concerned session management (SM) messages is given:

Activate PDP Context Request
Activate PDP Context Accept
Activate PDP Context Reject
Activate Secondary PDP Context Request
Activate Secondary PDP Context Accept
Activate Secondary PDP Context Reject
Request PDP Context Activation
Request PDP Context Activation Reject
Modify PDP Context Request
Modify PDP Context Accept
Modify PDP Context Reject
Deactivate PDP Context Request
Deactivate PDP Context Accept Specified below is the format of the "Activate PDP Context Request" according to the present invention. That is, specified are the changes to the existing knowledge as proposed by the present invention as an embodiment thereof. Thus, an example of the format of the new information element according to the present invention is presented:

Activate PDP Context Request

This message is sent by the UE to the network to request activation of a PDP context.

See table below.

| Message type: | ACTIVATE PDP CONTEXT REQUEST |
|---|---|
| Significance: | global |
| Direction: | UE to network |

Table ACTIVATE PDP CONTEXT REQUEST
Message Content

| IEI | Information Element | Type/Reference | Presence | Format | Length |
|---|---|---|---|---|---|
| | Protocol discriminator | Protocol discriminator | M | V | ½ |

-continued

| IEI | Information Element | Type/Reference | Presence | Format | Length |
|---|---|---|---|---|---|
| | Transaction identifier | 10.2 Transaction identifier 10.3.2 | M | V | ½-3½ |
| | Activate PDP Context Request message identity | Message type 10.4 | M | V | 1 |
| | Requested NSAPI | Network service access point identifier 10.5.6.2 | M | V | 1 |
| | Requested LLC SAPI | LLC service access point identifier 10.5.6.9 | M | V | 1 |
| | Requested QoS | Quality of service 10.5.6.5 | M | LV | 12 |
| | Requested PDP address | Packet data protocol address 10.5.6.4 | M | LV | 3-19 |
| 28 | Access point name | Access point name 10.5.6.1 | O | TLV | 3-102 |
| 27 | Protocol configuration options | Protocol configuration options 10.5.6.3 | O | TLV | 3-253 |
| | Encapsulated application level message | Encapsulated application level message | O | TLV | 3-1025 |

The new information element IE as proposed by the present invention is marked in bold.

Description of the Encapsulated Application Level Message

The purpose of the encapsulated application level message information element is to carry application specific information in session management (SM) messages, and to indicate to the GGSN which generic procedure to use.

The encapsulated application level message is a type 4 information element with a minimum length of 3 octets. The maximum length for the information element IE is 1025 octets. It is to be noted that the information element IE length restriction is due to the maximum length that can be encoded by using 10 bits.

Figure 4:
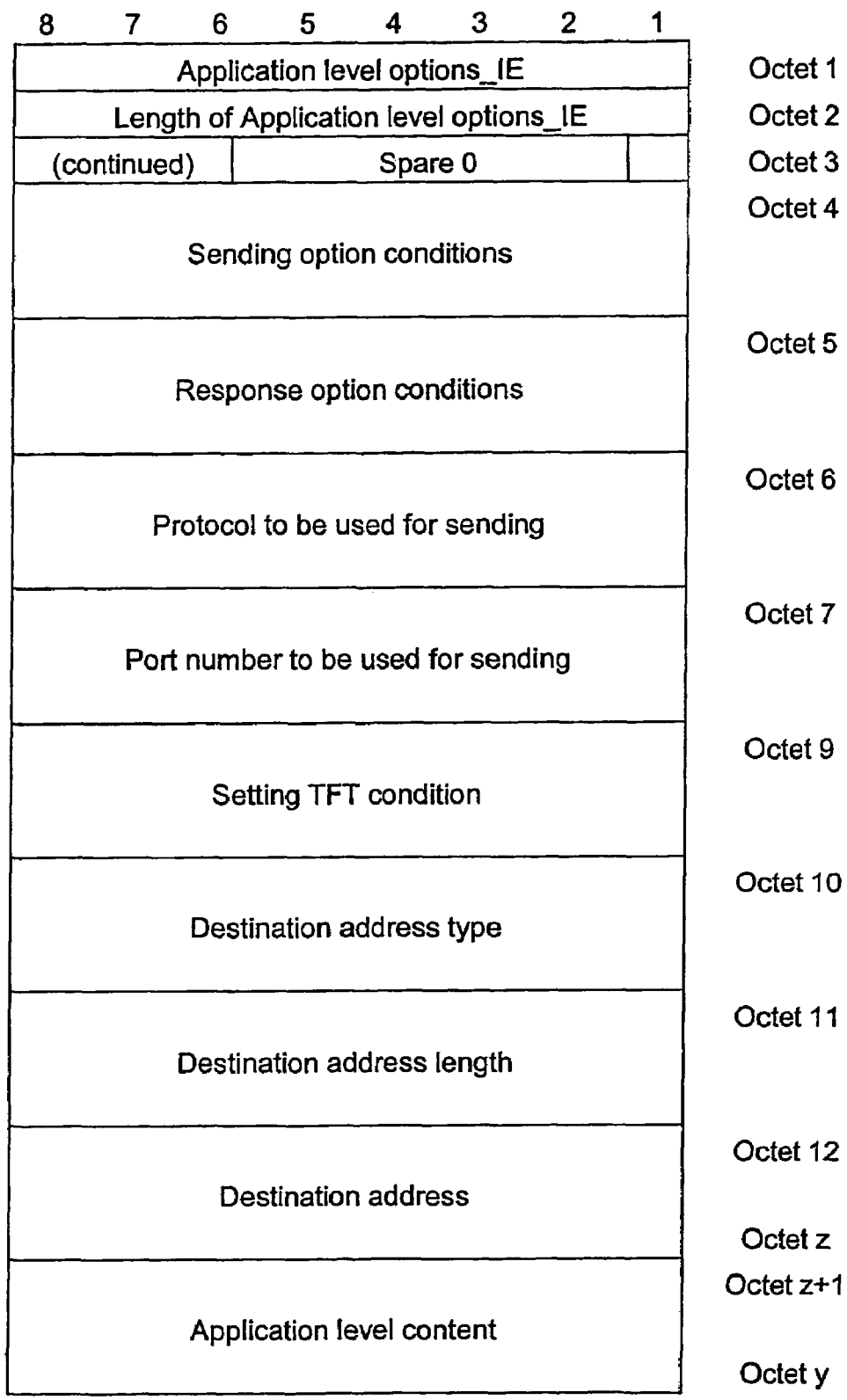
FIG. 4 shows the encapsulated application level message information element according to the present invention.

The encapsulated application level message_information element is coded as shown in FIG. 4.

Below, the behavior of the Gateway GPRS Support Node GGSN is described in more detail.

When the Gateway GPRS Support Node GGSN receives a session management (SM) message with an encapsulated application level message, it will first check:

1) Sending Option Conditions

This field indicates the sending of the application level message:

"if the PDP context is accepted", in which case the Gateway GPRS Support Node GGSN sends the application level message as soon as the Packet Data Protocol PDP context is accepted;

"if the Packet Data Protocol PDP context creation or modification is accepted with the Quality-of-Service (QoS) requested"; in which case the Gateway GPRS Support Node GGSN sends the application level message only if the Quality-of-Service (QoS) requested by the mobile terminal UE was accepted unchanged (it is remarked that this may require a new indication from the Serving GPRS Support Node SGSN to indicate what was the Quality-of-Service QoS requested by the mobile terminal UE). If the Quality-of-Service (QoS) was not accepted as such, the application level option is ignored (the mobile terminal UE will detect the change and perform needed action such as sending the appropriate application level message).

2) Response Option Conditions

This field indicates response options to the session management (SM) message:

"immediately"; in which case the Gateway GPRS Support Node GGSN sends the session management (SM) response message immediately (but it may still wait for some other signaling such as RADIUS if applicable);

"only when application message response is received"; the Gateway GPRS Support Node GGSN will prepare the session management (SM) response, but wait to receive the response from the application server. Based on the response of the application server, the Gateway GPRS Support Node GGSN will generate an encapsulated application level message which it will include in its own session management (SM) response. For example, this involves reading the User Datagram Protocol (UDP) port and copying in appropriate encapsulated application level message field;

stripping away IP/UDP header;

including the content of the User Datagram Protocol (UDP) packet in the encapsulated application level message content field; as well as using IP/UDP header info to properly set Port number to be used for sending.

Note that this field is applicable only for a session management (SM) request message and not for a response message.

3) The Protocol to be Used for Sending

In case of:

IPv4/UDP: The Gateway GPRS Support Node GGSN will include the encapsulated application level message content field in a IPv4/UDP packet;

IPv6/UDP: The Gateway GPRS Support Node GGSN will include the encapsulated application level message content field in a IPv6/UDP packet;

IPv4/TCP: The Gateway GPRS Support Node GGSN will include the encapsulated application level message content field in a IPv4/TCP (Transfer Control Protocol) packet; and IPv6/TCP: The Gateway GPRS Support Node GGSN will include the encapsulated application level message content field in a IPv6/TCP packet.

It is remarked that it is one alternative to omit this field, so that the User Datagram Protocol (UDP) is always used and the Packet Data Protocol (PDP) type indicates IPv6 (Internet Protocol version 6) or IPv4 (Internet Protocol version 4).

Another alternative is to have a more detailed indication such as that the Gateway GPRS Support Node GGSN will include the encapsulated application level message content field in a Session Initiation Protocol (SIP) register message over IPv6/UDP.

Still another alternative is that the address type indicates the lower level protocol: IPv4 or IPv6.

It is remarked that other protocols may be indicated such as L2TP/PPP (Layer 2 Transfer Protocol—Point to Point Protocol).

4) Port Number to be Used for Sending

The use of this port is to limit the need of a Gateway GPRS Support Node GGSN to know about the application protocol. So this field indicates to the Gateway GPRS Support Node GGSN if a fixed User Datagram Protocol (UDP) port is to be used (including the value) or if the User Datagram Protocol (UDP) port needs to be selected from a certain range.

5) Setting the Traffic Flow Template (TFT) Condition

If the mobile terminal UE indicates the destination address with a logical name, it cannot restrict the traffic for this Packet Data Protocol (PDP) context only fog this destination address. Thus, this field is used to indicate that only the traffic coming from the destination address (which is to be derived from the Gateway GPRS Support Node GGSN based on the logical name) on this Packet Data Protocol (PDP) context shall be allowed. It is remarked that the Packet Data Protocol (PDP) context signaling would be one use case for this feature. This field can have the contents:

Destination address type—This indicates if the address is a logical name, an IPv6 or IPv4 address; and Application level option content—This field includes the actual content that the Gateway GPRS Support Node GGSN relays from the session management (SM) message to the application level message it generates. In one preferred embodiment, this is a Session Initiation Protocol (SIP) message.

The invention is not limited to this format of encapsulated application level message. A simple implementation may be preferred where the GGSN behavior is simplified. For example, the GGSN may always forward the application message if the PDP context is accepted; it may always wait a certain time for an answer from the application server.

Besides, it is remarked that in the case where a mobile terminal UE is connected to a laptop, the mobile terminal UE could perform a similar function as the Gateway GPRS Support Node GGSN. In this case, some fields which are not applicable should be ignored.

Also the format may be different in uplink and downlink direction. For example, to simplify the behavior of the mobile terminal UE, the GGSN may still include the full message (i.e. including IP header) received by the application server in the response message as described above. But for the uplink, it may be more beneficial to not include the IP header, as the mobile terminal UE may not yet know its dynamic address at the time of sending the session management (SM) request and it may not know the real IP address of the application server.

It should be noted that this feature is specially advantageous for the network requested PDP context activation. This procedure is triggered by an IP packet arriving at the GGSN. Currently, the packet is stored in the GGSN and can be delivered to the mobile terminal UE over a normal PDP context only after a lot of signaling (including PDP context activation). One of the problems is that when the mobile terminal UE receives the Request PDP Context Activation, it does not know which message has triggered the application. Thus, the mobile terminal UE has too little information to decide whether to activate a new PDP context or not. However, according to the present invention, the full IP message could be sent to the mobile terminal UE. Therefore, in addition to saving round trip on the radio, it also provides more information to the mobile terminal UE. That is, e.g. the GGSN encapsulates the message received by the server in the message called PDU notification sent to the SGSN. The SGSN copies encapsulated information in the message called "Request PDP Context Activation" and sends it to mobile terminal UE.

It should be noted that the amount of encapsulated application level message should be recorded in the charging record.

What is described above is a method of carrying an application level message encapsulated inside a signaling message of an access network, said method comprising the steps of: receiving an application level message from a sender application process to an access network signaling process; adapting said application level message and encapsulating it in a signaling message of an access network; and delivering said encapsulated application level message to a receiver application process by transmitting said signaling message, wherein said encapsulated application level message is transparent to the means of said access network transmitting said signaling message.

Although it is described above what are the preferred embodiments of the present invention, it is apparent to those skilled in the art that various modifications are possible without departing from the scope of the present invention as defined by the appended claims.

The invention claimed is:

1. A method, comprising:
receiving an application level message from a sender application process to an access network signaling process;
encapsulating said application level message in a signaling message of an access network; and
initiating transmission of said encapsulated application level message to a network node by transmitting said signaling message, wherein
said encapsulated application level message is transparent to a device of said access network transmitting said signaling message,
said application level message comprises an indication of conditions to deliver the application message, and
said application level message is sent after a packet data protocol context is accepted by a gateway,
said encapsulated application level message comprises a complete session initiation protocol message.

2. A method according to claim 1, wherein said sender application process is performed in a mobile terminal coupled to said access network.

3. A method according to claim 1, wherein said sender application process is performed in an application server configured to provide a corresponding application.

4. A method according to claim 1, wherein said indication comprises an address of an application server, said address being one of the group comprising a logical name, an internet protocol address, and a port number.

5. A method according to claim 1, wherein said indication comprises an indication of whether to deliver said signaling message when the quality-of-service changes.

6. A method according to claim 1, wherein said method is implemented in a call establishment procedure for a voice over the internet protocol.

7. A method according to claim 1, wherein said encapsulated application level message is included in an activation request within a packet data protocol context signaling.

8. A method according to claim 3, wherein said application server is one of the group comprising a proxy call state control function, a push proxy server, and an instant message server.

9. A method according to claim 7, wherein a session initiation protocol signaling, a resource reservation protocol signaling, or a point to point protocol signaling is embedded into said packet data protocol context signaling.

10. A method according to claim 1, wherein said complete session initiation protocol message is sent by a gateway general packet radio system support node to a session initiation protocol proxy, wherein said gateway general packet radio system support node is configured to create an internet protocol/user datagram protocol header and to send said complete session initiation protocol message to a session initiation protocol proxy.

11. A method according to claim 10, wherein said header is created by using information sent in an optional application level message information element.

12. A method according to claim 10, wherein said header is created by using information coming from said packet data protocol context signaling.

13. A method according to claim 10, wherein said header is created by using information coming from a configuration process.

14. A method according to claim 7, wherein said encapsulated application level message indicates that a gateway general packet radio system support node shall send a context response message only when a response is received, as a reaction to which said gateway general packet radio system support node starts a timer to wait for an answer, and wherein a reply before the expiration of said timer is copied as a new encapsulated application level message in said context response message, and in case of no reply before the expiration of said timer, an indication that an answer was not received is copied as a new encapsulated application level message in said context response message.

15. A method according to claim 7, wherein said encapsulated application level message indicates that a gateway general packet radio system support node is configured to send a context response message immediately, as a reaction to which said gateway general packet radio system support node sends a context response message immediately, whereas a response of said receiver application process is returned to said sender application process in a non-encapsulated manner as normal traffic.

16. An apparatus, comprising:
receiving means for receiving an application level message from a sender application process to an access network signaling process;
encapsulating means for encapsulating said application level message in a signaling message of an access network, wherein said encapsulated application level message comprises a complete session initiation protocol message; and
transmitting means for initiating transmission of said encapsulated application level message to a network node, wherein
said encapsulated application level message is transparent to a device of said access network transmitting said signaling message, said application level message comprises an indication of conditions to deliver the application message, and
said application level message is sent after a packet data protocol context is accepted by a gateway.

17. An apparatus according to 16, wherein a server is configured to perform said sender application process.

18. An apparatus according to claim 17, wherein said server is one of the group comprising a proxy call state control function, a push proxy server means, and an instant message server.

19. A method, comprising:
receiving an encapsulated application level message, wherein said encapsulated application level message comprises a complete session initiation protocol message;
extracting content from the encapsulated application level message;
interpreting, from the extracted content of the encapsulated application level message, an address and conditions to send the extracted content of the encapsulated application level message; and
initiate sending of the extracted content to an application server in accordance with a packet data protocol context and one or more of the interpreted address and an access point name configuration.

20. The method of claim 19, wherein the conditions to send the encapsulated application level message comprise when a packet data protocol context is accepted or when a packet data protocol context is accepted with a desired quality of service.

21. The method of claim 19, wherein, when the address is indicated as a logical name, the logical name is resolved from the access point name configuration or by querying a directory name service system.

22. The method of claim 19, wherein the encapsulated application level message is included in an activation request within a packet data protocol context signaling.

23. The method of claim 22, wherein a session initiation protocol signaling, a resource reservation protocol signaling, or a point to point protocol signaling is embedded into said packet data protocol context signaling.

24. The method of claim 19, further comprising: creating an internet protocol/user datagram protocol header; and
forwarding the complete session initiation protocol message to a session initiation protocol proxy.

25. An apparatus, comprising:
a processor; and
a memory including computer program code;
the memory and the computer program code configured to, with the processor, cause the apparatus to perform at least the following,
receive an encapsulated application level message,
extract content from the encapsulated application level message, wherein said encapsulated application level message comprises a complete session initiation protocol message,
interpret, from the extracted content of the encapsulated application level message, an address and conditions to send the extracted content of the encapsulated application level message, and initiate sending of the extracted content to an application server in accordance with a packet data protocol context and one or more of the interpreted address and an access point name configuration.

26. The apparatus of claim 25, wherein the conditions to send the encapsulated application level message comprise when a packet data protocol context is accepted or when a packet data protocol context is accepted with a desired quality of service.

27. The apparatus of claim 25, wherein, when the address is indicated as a logical name, the apparatus is configured to resolve the logical name from the access point name configuration or by querying a directory name service system.

28. The apparatus of claim 25, wherein the apparatus is configured to include the encapsulated application level message in an activation request within a packet data protocol context signaling.

29. The apparatus of claim 28, wherein the apparatus is configured to embed a session initiation protocol signaling, a resource reservation protocol signaling, or a point to point protocol signaling into said packet data protocol context signaling.

30. The apparatus of claim 25 wherein the processor is further configured to
create an internet protocol/user datagram protocol header, and
initiate sending of the complete session initiation protocol message to a session initiation protocol proxy.

31. An apparatus, comprising:
a processor; and
a memory including computer program code;
the memory and the computer program code configured to, with the processor, cause the apparatus to perform at least the following,
receive an application level message from a sender application process to an access network signaling process,
encapsulate said application level message in a signaling message of an access network, wherein said encapsulated application level message comprises a complete session initiation protocol message, and
initiate transmission of said encapsulated application level message to a network node, wherein
said encapsulated application level message is transparent to device of said access network transmitting said signaling message,
said application level message comprises an indication of conditions to deliver the application message, and
said application level message is sent after a packet data protocol context is accepted by a gateway.

32. An apparatus according to claim 31, wherein said apparatus comprises a mobile terminal.

33. An apparatus according to claim 31, wherein said indication comprises an address of an application server, said address being one of the group comprising a logical name, an internet protocol address, and a port number.

34. An apparatus according to claim 31, wherein said indication comprises an indication of whether to deliver said signaling message when the quality-of-service changes.

35. An apparatus according to claim 31, wherein the apparatus is configured to transmit the encapsulated application level message as part of a call establishment procedure for a voice over the internet protocol.

36. An apparatus according to claim 31, wherein the apparatus is configured to include said encapsulated application level message in an activation request within a packet data protocol context signaling.

37. An apparatus according to claim 36, wherein said apparatus is configured to embed a session initiation protocol signaling, a resource reservation protocol signaling, or a point to point protocol signaling into said packet data protocol context signaling.

38. An apparatus according to claim 36, wherein said encapsulated application level message indicates that a gateway general packet radio system support node is configured to send a context response message only when a response is received, as a reaction to which said gateway general packet radio system support node starts a timer to wait for an answer, and wherein a reply before the expiration of said timer is copied as a new encapsulated application level message in said context response message, and in case of no reply before the expiration of said timer, an indication that an answer was not received is copied as a new encapsulated application level message in said context response message.

39. A system, comprising:
a network node; and
a user equipment comprising
a receiver configured to receive an application level message from a sender application process to an access network signaling process,
a processor configured to encapsulate said application level message in a signaling message of an access network, wherein said encapsulated application level message comprises a complete session initiation protocol message, and
a transmitter configured to transmit said encapsulated application level message to the network node,
wherein the network node comprises,
a receiver configured to receive the encapsulated application level message, a processor configured to
interpret, from the encapsulated application level message, an address and conditions to send the encapsulated application level message, and
extract content from the encapsulated application level message, and
a transmitter configured to forward the extracted content to an application server in accordance with one or more of the interpreted address, a packet data protocol context and an access point name configuration, wherein
said encapsulated application level message is transparent to device of said access network transmitting said signaling message, and
said application level message comprises an indication of conditions to deliver the application message.

* * * * *